United States Patent
Guo et al.

(10) Patent No.: US 10,937,086 B2
(45) Date of Patent: Mar. 2, 2021

(54) VEHICLE FOR PUBLIC RENTAL

(71) Applicants: Beijing BOE Display Technology Co., Ltd., Beijing (CN); BOE Technology Group Co., Ltd., Beijing (CN)

(72) Inventors: Yangchen Guo, Beijing (CN); Dong Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 18 days.

(21) Appl. No.: 16/426,777

(22) Filed: May 30, 2019

(65) Prior Publication Data
US 2020/0074535 A1 Mar. 5, 2020

(30) Foreign Application Priority Data
Aug. 31, 2018 (CN) .......................... 2018 1 1014229

(51) Int. Cl.
G06Q 30/06 (2012.01)
B62H 5/14 (2006.01)
B62H 5/20 (2006.01)
G06Q 50/30 (2012.01)
(Continued)

(52) U.S. Cl.
CPC .......... *G06Q 30/0645* (2013.01); *B62H 5/14* (2013.01); *B62H 5/20* (2013.01); *G06Q 50/30* (2013.01); *G07F 17/0057* (2013.01); *B62H 2003/005* (2013.01)

(58) Field of Classification Search
CPC ...... G06Q 30/0645; G06Q 50/30; B62H 5/14; B62H 5/20; B62H 2003/005; G07F 17/0057
See application file for complete search history.

(56) References Cited

U.S. PATENT DOCUMENTS 3,772,645 A * 11/1973 Odenz .................... B62H 5/003
340/571
4,322,714 A * 3/1982 Morgan ............. G08B 13/1436
340/427
(Continued)

FOREIGN PATENT DOCUMENTS

CN 100488816 C 5/2009
CN 103456146 A 12/2013
(Continued)

OTHER PUBLICATIONS

First Office Action dated Oct. 31, 2019 corresponding to Chinese application No. 201811014229.5.
(Continued)

*Primary Examiner* — Rufus C Point
(74) *Attorney, Agent, or Firm* — Nath, Goldberg & Meyer; Joshua B. Goldberg (57) ABSTRACT

The present disclosure provides a vehicle for public rental, comprising a vehicle body, the vehicle body is provided with a pickproof device, and the pickproof device comprises a detector and a controller; the detector is configured to detect characteristic information; and the controller is coupled to the detector and configured to determine whether the vehicle is in an abnormal state according to the characteristic information.

13 Claims, 4 Drawing Sheets

(51) Int. Cl.
*G07F 17/00* (2006.01)
*B62H 3/00* (2006.01)

(56) References Cited

U.S. PATENT DOCUMENTS

| | | | | |
|---|---|---|---|---|
| 4,379,281 | A * | 4/1983 | Thomas | B60R 25/1004 |
| | | | | 200/61.54 |
| 5,836,002 | A * | 11/1998 | Morstein | B60R 25/1001 |
| | | | | 340/568.1 |
| 9,694,240 | B2 * | 7/2017 | Baudhuin | A63B 24/00 |
| 2002/0034321 | A1 * | 3/2002 | Saito | G07C 9/27 |
| | | | | 382/124 |
| 2004/0230498 | A1 * | 11/2004 | Zimmerman | G06Q 30/0601 |
| | | | | 705/307 |
| 2007/0239465 | A1 * | 10/2007 | Le Gars | G06Q 20/10 |
| | | | | 705/39 |
| 2011/0226708 | A1 * | 9/2011 | Mercat | B62M 6/40 |
| | | | | 211/5 |
| 2013/0204645 | A1 * | 8/2013 | Lehman | G06Q 20/322 |
| | | | | 705/4 |
| 2016/0031506 | A1 * | 2/2016 | Lloyd | B62M 6/90 |
| | | | | 701/49 |
| 2016/0031517 | A1 * | 2/2016 | Neugebauer | B60L 53/14 |
| | | | | 180/207.3 |
| 2016/0059918 | A1 * | 3/2016 | Hensley | B62M 3/08 |
| | | | | 70/233 |
| 2018/0015974 | A1 * | 1/2018 | Yang | B62H 5/20 |

FOREIGN PATENT DOCUMENTS

| | | |
|---|---|---|
| CN | 203876713 U | 10/2014 |
| CN | 105459954 A | 4/2016 |
| CN | 106741337 A | 5/2017 |
| CN | 107444529 A | 12/2017 |
| CN | 207164529 U | 3/2018 |
| CN | 108100096 A | 6/2018 |
| DE | 4300288 A1 | 7/1994 |
| JP | 2000155887 A | 6/2000 |
| JP | 201131634 A | 2/2011 |

OTHER PUBLICATIONS

Second Office Action dated Jun. 19, 2020, for corresponding Chinese application No. 201811014229.5.

* cited by examiner

VEHICLE FOR PUBLIC RENTAL

CROSS-REFERENCE TO RELATED APPLICATION

This application claims the priority of China Patent Application No. 201811014229.5, filed on Aug. 31, 2018, entitled "vehicle for public rental", the entire contents of which are hereby incorporated by reference.

TECHNICAL FIELD

The present disclosure relates to the field of vehicles, and in particular to a vehicle for public rental.

BACKGROUND

Widespread vehicles for public rental such as shared bicycles, shared motorcycles and municipal public bicycles, make it easy for people to travel.

SUMMARY

At least one embodiment of the present disclosure provides a vehicle for public rental, comprising a vehicle body, wherein the vehicle body is provided with a pickproof device, and the pickproof device comprises a detector and a controller; the detector is configured to detect characteristic information; and the controller is coupled to the detector and configured to determine whether the vehicle is in an abnormal state according to the characteristic information.

Optionally, the detector comprises a pressure detector and a sound detector, and the characteristic information at least comprises information of an external force received by the vehicle body, the pressure detector is configured to detect a magnitude and a frequency of the external force received by the vehicle body; the sound detector is configured to detect sound information generated by the external force acting on the vehicle body; and the controller is configured to determine a type of the external force according to the sound information, and determine whether the external force is an abnormal external force according to the type of the external force and the magnitude and the frequency of the external force.

Optionally, the controller is coupled to a memory, and the memory is configured to store a plurality of external force types and the sound information corresponding to each external force type; the controller is configured to compare the sound information detected by the sound detector with the sound information corresponding to each external force type in the memory; determine the type of external force acting on the vehicle body according to a comparison result, and determine whether the external force is the abnormal external force according to the external force type and the magnitude and the frequency of the external force detected by the pressure detector.

Optionally, the vehicle body comprises at least one graphic mark carrier, and each graphic mark carrier is provided with an identity mark pattern of the vehicle; the detector is in one-to-one correspondence with the graphic mark carrier; the pressure detector is located on a surface of the corresponding graphic mark carrier, and the identity mark pattern is disposed on a pressure sensing surface of the pressure detector; and the sound detector is located within a range of a first distance from the identity mark pattern.

Optionally, the vehicle is a two-wheeled vehicle, the vehicle body comprises a handlebar and a lock; at least one of the handlebar and the lock is used as the graphic mark carrier.

Optionally, the graphic mark carrier is further provided with a protective layer covering the identity mark pattern and transmitting light.

Optionally, the protective layer is a graphene layer.

Optionally, the sound detector and the pressure detector are coupled to the controller by wires, the vehicle body comprises a support frame, the support frame comprises a plurality of support rods which are at least partially hollow, the sound detector and the wires are disposed in the support rods.

Optionally, the vehicle body comprises a lock configured to restrict a rotation of a wheel in a locked state to lock the vehicle body; the detector comprises a height detecting device disposed on the wheel, the characteristic information at least comprises a height of a reference position on the wheel, the height detecting device is configured to detect the height of the reference position on the wheel during locking of the vehicle body; the controller is further configured to determine whether the vehicle body has an abnormal movement according to change information of the height of the reference position on the wheel during locking of the vehicle body.

Optionally, the lock comprises a lock cylinder, the wheel has a plurality of spokes; in the lock in the locked state, the lock cylinder passes through a space between the spokes; the controller is configured to calculate a difference between each height detected by the height detecting device and a first height during locking of the vehicle body; the abnormal movement of the vehicle body is determined in a case where the difference is not less than 4*R sin(α/2); wherein R is a radius of the wheel and α is an angle between the spokes of the wheel.

Optionally, the vehicle body comprises a lock configured to restrict rotation of a wheel in a locked state to lock the vehicle body; the detector comprises a friction detecting device disposed on the wheel, the characteristic information at least comprises a friction distance between the wheel and a ground, the friction detecting device is configured to detect the friction distance between the wheel and the ground during locking of the vehicle body; the controller is further configured to determine whether the vehicle body has an abnormal movement according to the friction distance detected by the friction detecting device.

Optionally, the lock comprises a lock cylinder, the wheel has a plurality of spokes; in the lock in the locked state, the lock cylinder passes through a space between the spokes; the controller is configured to determine the abnormal movement of the vehicle body in a case where the friction distance is not less than π*R*α/90; wherein R is a radius of the wheel and α is an angle between the spokes of the wheel.

Optionally, the pickproof device further comprises an alarm coupled to the controller; the controller is further configured to generate an alarm control signal in response to determining the abnormal state; and the alarm is configured to generate an alarm signal according to the alarm control signal.

Optionally, the alarm is configured to generate at least one of sound, light, and vibration.

Optionally, the pickproof device further comprises a positioning device and a communication device both coupled to the controller, the positioning device is configured to acquire position information of the vehicle; the controller is configured to, in response to determining the abnormal state, send reminder information by the communication device to a management terminal supervising the vehicle or at least one user terminal located around the vehicle and having a distance from the vehicle that is less than a second distance, and the reminder information at least comprises the position information of the vehicle.

Optionally, the reminder information further comprises information of the abnormal state.

BRIEF DESCRIPTION OF THE DRAWINGS

The drawings are provided for further understanding of the present disclosure and constitute part of this specification. The drawings together with the following specific embodiments are provided to illustrate the present disclosure, but not limit the present disclosure. In the drawing.

DETAILED DESCRIPTION OF THE EMBODIMENTS

Specific embodiments of the present disclosure are described in detail below in conjunction with the accompanying drawings. It should be understood that the specific embodiments described herein are configured only to illustrate and interpret the present disclosure and not to limit the present disclosure.

There are many cases of damage and theft in vehicles for public rental. For shared bicycles, the vandal generally destroys the QR code and vehicle number of the shared bicycle so that only the vandal can unlock the vehicle. What's more, a lock of the shared bicycle may be destroyed, and the bicycle body is painted and then the lock is replaced, so that the vehicle is completely occupied after being disguised.

In the following embodiments, the term "a vehicle for public rental" refers to a public-transportation vehicle that can be operated for an unspecified multi-person use in a time-sharing mode. There are two kinds of storage modes for the vehicles: with pile or without pile. The vehicles with pile for example municipal public bicycles and the vehicles without pile for example various shared bicycles are known. In terms of driving type, the vehicles include the shared bicycles with human driven, such as Mobike, ofo, LimeBike, and Spin; or the shared bicycles with electrical power driven, such as Zebra, No. 7, Jump Bike, HOPR Bike, etc.

It should be noted that the present disclosure is not limited to a shared vehicle, and may be applied to a bicycle, an electric bicycle, a moped, or the like that is purchased by a user and remotely managed by a public network.

In the following embodiments, a controller may include one or more processors, which may be a logic computing device having data processing capabilities and/or program execution capabilities, such as an a central processing unit (CPU), a field programmable gate array (FPGA), a microcontroller unit (MCU), a digital signal processor (DSP), and an application specific integrated circuit (ASIC).

In the following embodiments, a memory may be, for example, a volatile memory and/or a non-volatile memory. The volatile memory may include, for example, a random access memory (RAM) and/or a cache or the like. The non-volatile memory may include, for example, a read only memory (ROM), a hard disk, a flash memory, or the like.

In the following embodiments, the coupling may be realized through a network connection, such as a wireless network, a wired network, and/or any combination of a wireless network and a wired network. The network may include a local area network, the Internet, a telecommunications network, an Internet of Things based on Internet and/or telecommunications network, and/or any combination of the above networks, or the like. The wired network can communicate by, for example, a twisted pair, coaxial cable or optical fiber transmission. The wireless network can communicate by, for example, a 3G/4G/5G mobile communications network, Bluetooth, Zigbee or Wi-Fi.

In the following embodiments, in order to facilitate understanding and description, in some paragraphs, the functional description of the controller uses a description of the functional circuit corresponding to the function to be performed by the controller. It is easy to understand that these circuits are functional entities and do not necessarily correspond to physically or logically separate entities. The controller may implement these functional entities by running software in the form of executing computer instructions, or programmatically implement these functional entities in one or more hardware modules or integrated circuits.

The present disclosure provides a vehicle for public rental, comprising a vehicle body, wherein the vehicle body is provided with a pickproof device.

Figure 1:
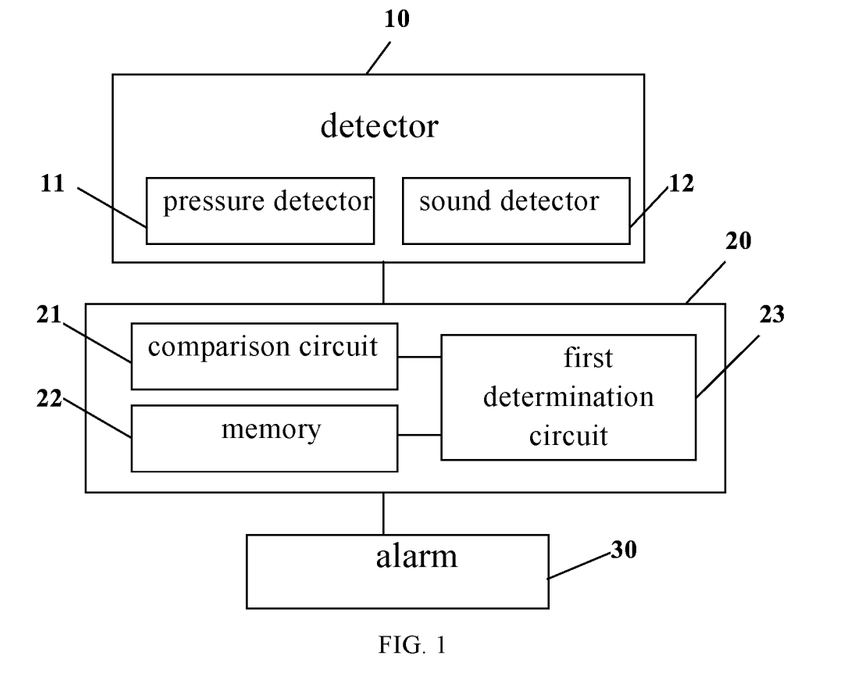
FIG. 1 is a schematic structural view of a first kind of a pickproof device in a vehicle for public rental provided in the present disclosure.

As shown in FIG. 1, in the vehicle provided by some embodiments of the present disclosure, the pickproof device includes a detector 10 and a controller 20. The detector 10 is configured to detect characteristic information; and the controller 20 is coupled to the detector 10 and configured to determine whether the vehicle is in an abnormal state according to the characteristic information. Examples of the characteristic information are set forth below. The abnormal state of the vehicle herein refers to a state in which the vehicle is unnaturally rested or operated, such as being damaged by external force, being forcibly dragged or transported.

The detector 10 is configured to detect characteristic information. For example, the characteristic information may include, but not limited to, information of an external force, where the information of the external force may include at least one of a magnitude of the external force, a frequency (a frequency at which the external force acts on the vehicle body) of the external force, and sound information generated when the external force acts on the vehicle body.

The controller 20 is coupled to the detector 10 and configured to determine whether the vehicle is in an abnormal state according to the characteristic information (for example, the information of the external force).

In some embodiments, the pickproof device further includes an alarm 30 coupled to the controller 20. The controller 20 may be configured to generate an alarm control signal when the external force is determined as an abnormal external force (for example, the controller 20 may determine whether the external force is an abnormal external force by comparing the information of the external force with a range of information of a normal external force). The alarm 30 is configured to generate an alarm signal according to the alarm control signal. The present disclosure does not specifically limit the specific form of the alarm signal. For example, the alarm signal may be a vibration signal (for example, the alarm 30 is a vibration motor), a sound signal (for example, the alarm 30 is a buzzer or a speaker), and an optical signal (for example, the alarm 30 is a flash lamp, an LED) or the like.

In the present disclosure, when the vehicle is subjected to an abnormal external force, it indicates that the vehicle is being maliciously damaged. At this time, the controller 20 generates an alarm control signal, and the alarm 30 generates an alarm signal according to the alarm control signal. Therefore, the surrounding people are reminded to pay attention and go forward to stop the destructive behavior, thereby reducing the malicious destruction of the vehicle.

In some embodiments, the detector 10 includes a pressure detector 11 and a sound detector 12, and the characteristic information at least includes information of an external force received by the vehicle body. The pressure detector 11 is configured to detect a magnitude and a frequency of the external force received on a pressure sensing surface thereof. The sound detector 12 is configured to detect sound information (such as loudness, pitch, frequency, and tone of the sound) generated by the external force acting on the vehicle body. The controller 20 is configured to determine a type of the external force according to the sound information, and determine whether the external force is an abnormal external force according to the type of the external force and the magnitude and the frequency of the external force. In this case, the abnormal external force is a force that the vehicle is subjected to under abnormal use, for example, a force generated by a sharp object with rapid rubbing, a force generated by a blunt object with violent pounding, or the like.

Accordingly, the information of the external force includes the magnitude and frequency of the external force detected by the pressure detector 11 and the sound information generated when the external force acts on the vehicle body.

In some embodiments, the sound information may include voiceprint information.

In some embodiments, the pressure detector 11 may be a membrane pressure sensor.

In some embodiments, the controller is coupled to a memory configured to store a plurality of external force types and sound information corresponding to each external force type (i.e., a correspondence between the two).

For example, the so-called memory may be a memory local to the vehicle and integrated within the controller, for example the memory 22 as shown in FIG. 1.

For example, the so-called memory may also be a memory local to the vehicle but independent of the controller.

For example, the so-called memory can also be a memory located in a remote server or cloud and in communication with the controller.

In some embodiments, the memory is configured to update the plurality of the external force types and the correspondence of the sound information corresponding to each external force type periodically or on demand.

In some embodiments, the controller is configured to compare the sound information detected by the sound detector with the sound information corresponding to each external force type in the memory; determine the type of external force acting on the vehicle body according to a comparison result; and determine whether the external force is the abnormal external force according to the external force type and the magnitude and the frequency of the external force detected by the pressure detector.

For ease of understanding, in the manner described by functional entities, the controller 20 includes a comparison circuit 21, a memory 22, and a first determination circuit 23, as shown in FIG. 1.

The memory 22 stores a plurality of external force types and a range of sound information corresponding to each external force type.

For example, the type of the external force includes the type of a tool for applying force and the way of applying force.

The comparison circuit 21 is configured to compare the sound information collected by the sound detector 12 with the range of the sound information corresponding to each external force type in the memory 22.

The first determination circuit 23 is configured to determine the type of external force acting on the vehicle body according to a comparison result of the comparison circuit 21; and determine whether the external force is the abnormal external force according to the external force type and the magnitude and the frequency of the external force detected by the pressure detector 11.

In some embodiments, the comparison result of the comparison circuit 21 may be the matching degree between the sound information collected by the sound detector 12 and the range of the sound information corresponding to each external force type. The first determination circuit 23 determines the external force type according to the comparison result of the comparison circuit 21, and determines whether the external force is the abnormal external force according to the external force type in combination of the magnitude and the frequency of the external force.

For example, when the comparison circuit 21 determines by comparison that the external force type matches with a pounding of a blunt object and the pounding force reaches a certain threshold, the external force is determined as the abnormal external force.

For another example, when the comparison circuit 21 determines by comparison that the external force type matches with cutter-rubbing and the frequency of rubbing reaches a certain threshold, the external force is determined as the abnormal external force.

In some embodiments, the vehicle for public rental may specifically be a shared vehicle without pile. The vehicle body includes at least one graphic mark carrier, and each graphic mark carrier is provided with an identity mark pattern of the vehicle.

For example, the identity mark pattern may be the QR code pattern or the vehicle number.

Normally, a malicious user can make the vehicle available only to the user by destroying the identity pattern of the vehicle. Optionally, in order to ensure that the alarm can be operated when the identity mark pattern is damaged, the detector 10 is in one-to-one correspondence with the graphic mark carrier. The pressure detector 11 of the detector 10 is located on a surface of the corresponding graphic mark carrier, and the identity mark pattern is disposed on a pressure sensing surface of the pressure detector 11. The sound detector 12 is located within a range of a first distance from the identity mark pattern (for example, the first distance is selected such that the sound detector can accurately and clearly obtain the sound generated when the external force acts on the graphic mark carrier).

Figure 2:
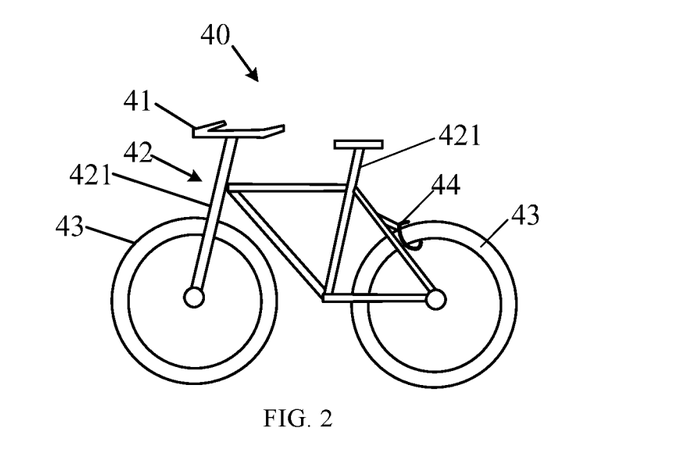
FIG. 2 is a schematic structural view of a vehicle body of the vehicle provided in the present disclosure.

In some embodiments, the vehicle is a two-wheeled vehicle. As shown in FIG. 2, the vehicle body 40 includes a handlebar 41, a support frame 42, wheels 43 and a lock 44. The support frame 42 includes a plurality of support rods 421 which are at least partially hollow, and the handlebar 41 and the lock 44 are both connected to the support rod 421.

At least one of the handlebar 41 and the lock 44 may be used as the graphic mark carrier. For example, the handlebar 41 and the lock 44 are both provided as graphic mark carriers, that is, both the handlebar 41 and the lock 44 are provided with an identity mark pattern.

Figure 3:
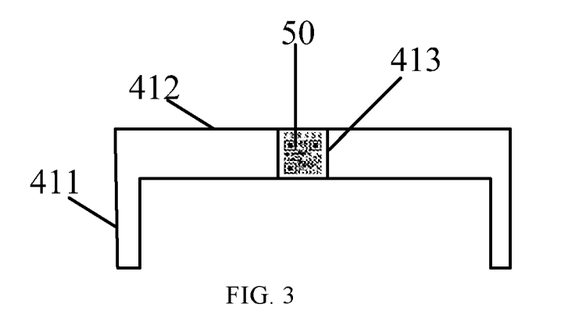
FIG. 3 is a top plan view of a handlebar of the vehicle provided in the present disclosure.
Figure 4:
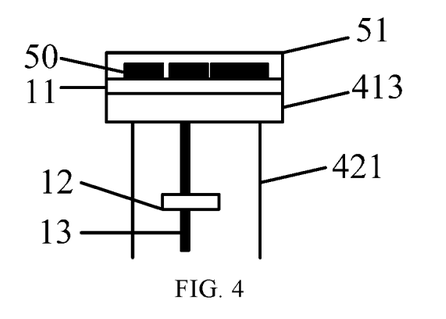
FIG. 4 is a cross-sectional view of a boss of the handlebar and a portion of a support rod.

Taking the handlebar as an example, FIG. 3 is a top plan view of the handlebar, and FIG. 4 is a cross-sectional view of a boss of the handlebar and a portion of the support rod. As shown in FIGS. 3 and 4, the handlebar 41 includes a handle 411, a middle handle 412, and a boss 413 disposed in the middle of the middle handle 412. A pressure detector corresponding to the handlebar 41 covers the surface of the boss 413, and an identity mark pattern 50 on the handlebar 41 is disposed on the pressure sensing surface of the pressure detector on the boss 413.

A lock 44 is configured to restrict a rotation of a wheel 43 in a locked state to lock the vehicle body 40.

Figure 5:
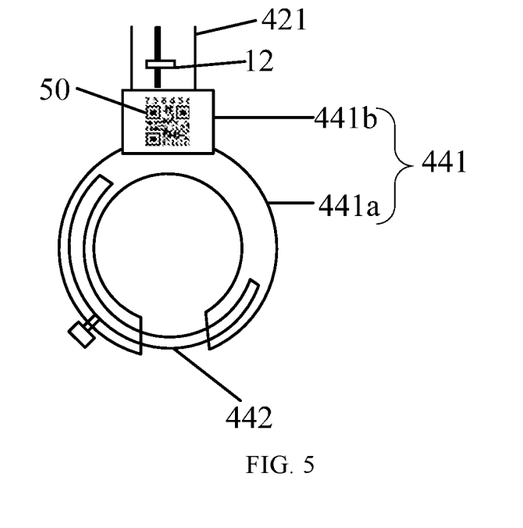
FIG. 5 is a schematic structural view of a lock attached with a portion of the support rod in the vehicle provided in the present disclosure.

For example, FIG. 5 shows a schematic structural view of a lock attached with a portion of the support rod. In some embodiments, the lock 44 includes a lock housing 441 and a curved lock cylinder 442. In the lock 44 in a locked state, the lock cylinder 422 passes through a space between spokes of the wheel 43, so as to restrict the rotation of the wheel 43. The lock housing 441 includes a lock cylinder accommodation portion 441a that wraps the lock cylinder 442, and a controller accommodation portion 441b that is connected to the lock cylinder accommodation portion 441a. The identity mark pattern 50 on the lock 44 is disposed on the surface of the controller accommodation portion 441b. The first determination circuit 23 of the controller 20 is disposed in the controller accommodation portion 441b.

In some embodiments, outer surfaces of the lock housing 441 and the lock cylinder 442 may both be covered with a film pressure sensor. At this time, the pressure can be detected by the film pressure sensor regardless of whether the lock housing 441 or the lock cylinder 442 is broken. At the same time, the sound generated at the time of destruction can be detected by the sound detector 12, thereby causing the controller 20 to generate an alarm control signal.

In some embodiments, the controller accommodation portion 441b and the boss 413 are both formed of cast iron material and integrated with the support frame 42 to increase the robustness of the vehicle body, thereby reducing the possibility of damage to the vehicle body.

In some embodiments, the identity mark pattern 50 is sprayed with a metallic paint material to prevent the identity mark pattern from being easily rubbed away.

Optionally, in order to further reduce the destruction of the identity mark pattern, a QR code carrier is further provided with a protective layer 51 covering the identity mark pattern and transmitting light, as shown in FIG. 4.

For example, the protective layer 51 is a graphene layer. The graphene layer has the advantages of high transparency, high hardness and corrosion resistance, thereby ensuring that the user can obtain the information of the identity mark pattern, and enhancing the protection effect of the protective layer at the same time.

It should be noted that although not shown in FIG. 5, a protective layer may also be disposed on the identity mark pattern 50 on the lock 44.

In some embodiments, as shown in FIGS. 4 and 5, the sound detector 12 and the pressure detector 11 are both coupled to the controller 20 by wires 13, and the sound detector 12 and the wires 13 are both disposed in the support rod 421 so as to prevent damage.

In some embodiments, the sound detector 12 and the pressure detector 11 can be connected to the controller 20 by wireless connection.

Optionally, the comparison circuit 21, the memory 22, and the first determination circuit 23 of the controller 20 are integrated.

Optionally, two comparison circuits 21 and two memories 22 can be set, wherein one comparison circuit 21 and one memory 22 are integrated with the pressure detector 11 corresponding to the handlebar 41, and are disposed in the hollow support rod 421.

Figure 6:
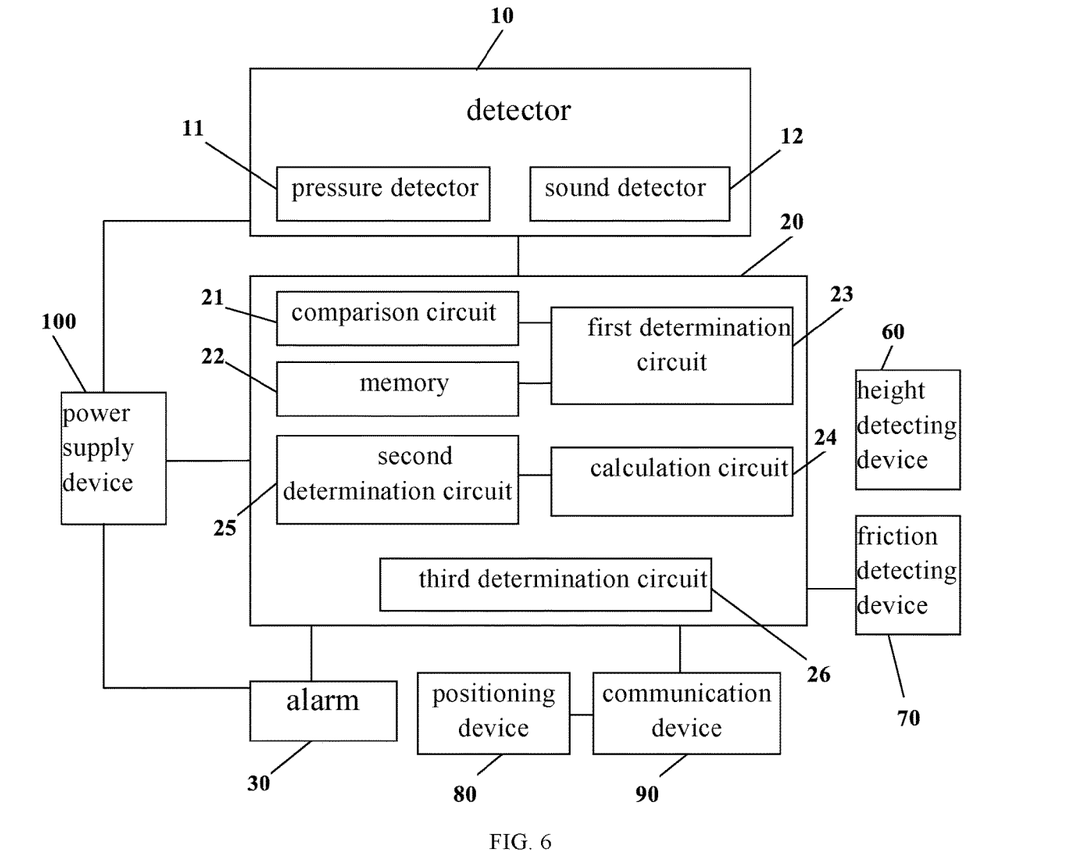
FIG. 6 is a schematic structural view of a second kind of the pickproof device in the vehicle provided in the present disclosure.

In some embodiments, the pickproof device further includes a power supply device 100. As shown in FIG. 6, the power supply device 100 is connected to the detector 10, the controller 20, and the alarm 30, so as to supply power to the detector 10, the controller 20, and the alarm 30 in an open state.

The power supply device 100 can be implemented by various power sources such as a lithium battery, a storage battery, and the like. Optionally, the power supply device 100 includes a solar cell. For example, the solar cell may specifically be a cell panel, and the cell panel is tiled in the basket or disposed elsewhere in the vehicle body. Optionally, the power supply device 100 is connected to the detector 10, the controller 20, and the alarm 30 by wires disposed within the support rods 421.

Figure 7:
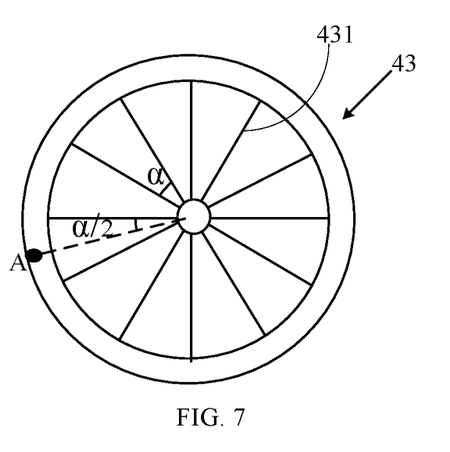
FIG. 7 is a schematic structural view of a wheel of the vehicle provided in the present disclosure.

In practical applications, in addition to the case mentioned above where the vehicle is destroyed, it may also occur that the vehicle for public rental is moved or dragged away in a locked state by the thief. In order to reduce such theft, embodiments of the present disclosure further determine whether the vehicle has an abnormal movement by detecting a change in height of the reference position on the wheel 43 and/or by detecting a friction distance between the wheel 43 and the ground.

In some embodiments, the detector of the pickproof device further includes a height detecting device 60, as shown in FIG. 6. For example, the height detecting device 60 is disposed on the wheel 43. In this case, the characteristic information further includes a height of a reference position on the wheel. The height detecting device 60 is configured to detect the height of the reference position (position A as shown in FIG. 7) on the wheel 43 during locking of the vehicle body 40.

For example, the height detecting device 60 may specifically be a height sensor, a distance measuring sensor, a displacement sensor, or the like. The height detecting device 60 may be disposed at the end of one spoke 431 away from a center of the wheel 43.

The controller 20 is configured to determine whether the vehicle body has an abnormal movement according to change information of the height of the reference position on the wheel 43 during locking of the vehicle body 40. The alarm control signal is generated if an abnormal movement occurs. The alarm 30 generates an alarm signal according to the alarm control signal to alert the surrounding people. The change information of the height may be a height-change amount or other information for example a height-change frequency.

For ease of understanding, the process by which the controller implements the above method in a functional logic is described in the manner of functional entities. The controller 20 further includes a calculation circuit 24 and a second determination circuit 25. The calculation circuit 24 is configured to calculate a difference between each height detected by the height detecting device 60 and a first height (i.e., an initial height detected by the height detecting device 60) in real time during locking of the vehicle body 40. That is, when the height detecting device 60 detects a height, the calculation circuit 24 calculates the difference between the height and the first height. The second determination circuit is configured to determine whether the difference calculated by the calculation circuit is greater than $4*R \sin(\alpha/2)$, and if so, determine that the vehicle body has an abnormal movement; wherein R is a radius of the wheel and $\alpha$ is an angle between the spokes of the wheel.

During the locking of the vehicle body 40, the maximum angle at which the wheel 43 rotates is a. The maximum value of the height-change of the height sensor is related to a and the radius R of the wheel. As shown in FIG. 7, when the reference position A is located on the rim (i.e., the reference position A is located on the end of the spoke away from the center of the wheel), and when the angle between a line connecting the reference position and the center of the wheel 43 at an initial time of lock and the horizontal plane is $\alpha/2$, the maximum value of the height-change of the reference position A is $2*R \sin(\alpha/2)$. When the reference position at the initial time of lock is at other positions, the height-change amount is less than $2*R \sin(\alpha/2)$. Therefore, when a height difference calculated by the calculation circuit 24 at a certain time is greater than $2*R \sin(\alpha/2)$, it can be basically determined that the vehicle body has been moved. In order to prevent erroneous determination, the second determination circuit 25 sets a threshold to $2*R \sin(\alpha/2)$ when determining whether the vehicle body has been moved according to the height-change, that is, comparing the height difference calculated by the calculation circuit 24 with $4*R \sin(\alpha/2)$.

In some embodiments, the detector of the pickproof device further includes a friction detecting device 70 as shown in FIG. 6. For example, the friction detecting device 70 is disposed on the wheel 43. In this case, the characteristic information further includes a friction distance between the wheel and a ground. The friction detecting device 70 is configured to detect the friction distance between the wheel 43 and the ground during locking of the vehicle body 40. The controller 20 is further configured to determine whether the vehicle body has an abnormal movement according to the friction distance detected by the friction detecting device 70. The alarm control signal is generated if the abnormal movement occurs.

Wherein, the friction distance refers to the sum of distances of rolling friction and sliding friction between the wheel 43 and the ground. When the lock 44 is locked, the wheel 43 can be rotated within a certain angle range. In this case, the rolling friction occurs between the wheel 43 and the ground. When an angle the wheel 43 rotates has reached a maximum value and the wheel is forcibly dragged, the sliding friction occurs between the wheel 43 through which the lock cylinder 442 passes and the ground.

For ease of understanding, the process by which the controller implements the above method in a functional logic is described in the manner of functional entities. As shown in FIG. 6, the controller 20 further includes a third determination circuit 26 configured to determine an abnormal movement of the vehicle body in a case where the friction distance detected by the friction detecting device 70 is larger than $\pi*R*\alpha/90$; wherein R is a radius of the wheel 43 and $\alpha$ is an angle between the adjacent spokes 431 of the wheel. When the lock 44 is in the locked state, since the lock cylinder 442 passes through the space between the two spokes 431, a rotation angle of the wheel 43 does not exceed a. Accordingly, the friction distance between the wheel 43 and the ground does not exceed $\pi*R*\alpha/180$. In order to prevent erroneous determination, the third determination circuit 26 sets a threshold to 2 times $\pi*R*\alpha/180$ when determining whether the vehicle body has the abnormal movement according to the friction distance, that is, comparing the friction distance detected by the friction detecting device 70 with $\pi*R*\alpha/90$.

It should be noted that one or both of the height detecting device 60 and the friction detecting device 70 may be disposed on the wheel 43. As long as the difference between the height detected by the height detecting device 60 and the height at the initial time exceeds $4*R \sin(\alpha/2)$, or the friction distance detected by the friction detecting device 70 exceeds $\pi*R*\alpha/90$, the controller 20 generates an alarm control signal.

In practical applications, maintenance personnel will perform maintenance on the vehicle, and the locked vehicle will also be moved in this case. In order to prevent the vehicle from alarming during normal maintenance, in some embodiments, the pickproof device further includes an anti-alarm device configured to send a stop determination instruction to the controller upon receiving an anti-alarm instruction issued by a management terminal associated with the vehicle. The controller stops determining whether the vehicle body has the abnormal movement according to the stop determination instruction.

For example, the anti-alarm device can be implemented as a computer instruction executed by the controller, and when the controller executes the computer instruction, a step of determining whether the vehicle body has the abnormal movement is interrupted.

For example, the anti-alarm device can be implemented as a hardware circuit coupled to the controller or integrated in the controller, such as an interrupter or the like, which generates an interrupt signal to stop the controller from performing the step of determining whether the vehicle body has the abnormal movement.

An alarm signal is sent through the alarm to alert the surrounding people, so as to reduce vehicle damage and theft. In order to alert more people to the vehicle damage and theft, in some embodiments, the pickproof device further includes a positioning device 80 and a communication device 90, as shown in FIG. 6.

The positioning device 80 may be a locator based on a positioning system such as GPS/Beidou/Galileo (determining position information by a satellite positioning signal), a wireless cellular network locator (determining position information by a base station of a communication carrier of the wireless cellular network), or a locator that integrates both above functions.

The communication device 90 may include a wireless communication network module, such as a wireless communication network module supporting at least one communication mode of GPRS, EDGE, CDMA 1x, EVDO, WCDMA, TD LTE, FDD LTE, WiMAX, and PHS.

The positioning device 80 is configured to acquire position information of the vehicle; the controller is configured to, in response to determining the abnormal state, send reminder information by the communication device 90 to a management terminal supervising the vehicle or at least one user terminal located around the vehicle and having a distance from the vehicle that is less than a second distance (such as 200 m or 100 m), and the reminder information at least includes the position information of the vehicle.

In some embodiments, the alarm 30, the positioning device 80, and the communication device 90 may be disposed in the controller accommodation portion 441b to prevent damage by external force.

The terminal that receives the reminder information sent by the communication device 90 may be a terminal associated with the vehicle, that is, a terminal that is installed with an APP that rents the vehicle. The reminder information may include, in addition to the position information of the vehicle, a vehicle number, an abnormal type of the vehicle, and the like.

Optionally, the alarm control signal generated by the controller 20 when the vehicle receives an abnormal external force is a first alarm control signal, and the alarm signal generated by the controller 20 when determining that the vehicle has the abnormal movement is a second alarm control signal. In this case, when the controller 20 generates the first alarm control signal, the reminder information may be "The vehicle with the number xxx is being damaged, please help stop! The vehicle position is xxx"; when the controller 20 generates the second alarm control signal, the reminder information may be "The vehicle with the number xxx is abnormally transferred, please help stop! The vehicle position is xxx". At the same time, whether the controller generates the first alarm control signal or the second alarm control signal, the alarm generate the alarm signal to remind the surrounding people to stop the vehicle damage and theft.

In actual operation, when the vehicle is subjected to an abnormal external force, the pickproof device can simultaneously send the information of the external force detected by the detector 10 to a management system of an operating company (i.e., the management terminal). In addition, the user terminal can also receive a stop instruction for the user. The user who stops the damage behavior can send the stop instruction back to the terminal. When the position of the user who stops the damage behavior coincides with the position of the damaged vehicle (i.e., the vehicle subjected to the abnormal external force), the management system of the operating company sends an alarm stop instruction to the damaged vehicle. The alarm 30 stops issuing the alarm signal according to the alarm stop instruction.

The above is a description of a vehicle provided in the present disclosure. It can be seen that the vehicle of the present disclosure is provided with a pickproof device that issues an alarm signal when the vehicle is subjected to an abnormal external force or has an abnormal movement. The pickproof device also sends a signal to surrounding terminal associated with the vehicle, thereby alerting surrounding people to prevent damage behavior, thereby reducing the occurrence of vehicle damage and theft.

It should be understood that the above embodiments are merely exemplary embodiments employed to explain the principles of the present disclosure, but the present disclosure is not limited thereto. Various modifications and improvements can be made by those skilled in the art without departing from the spirit and scope of the disclosure, and such modifications and improvements are also considered to be within the scope of the disclosure.

The invention claimed is:

1. A vehicle for public rental, comprising a vehicle body, wherein the vehicle body is provided with a pickproof device, and the pickproof device comprises a detector and a controller;

the detector is configured to detect characteristic information; and
the controller is coupled to the detector and configured to determine whether the vehicle is in an abnormal state according to the characteristic information,
wherein the detector comprises a pressure detector and a sound detector, and the characteristic information at least comprises information of an external force received by the vehicle body,
the pressure detector is configured to detect a magnitude and a frequency of the external force received by the vehicle body;
the sound detector is configured to detect sound information generated by the external force acting on the vehicle body; and
the controller is configured to determine a type of the external force according to the sound information, and determine whether the external force is an abnormal external force according to the type of the external force and the magnitude and the frequency of the external force,
wherein the controller is coupled to a memory, and the memory is configured to store a plurality of external force types and the sound information corresponding to each external force type;
the controller is configured to compare the sound information detected by the sound detector with the sound information corresponding to each external force type in the memory;
determine the type of external force acting on the vehicle body according to a comparison result; and
determine whether the external force is the abnormal external force according to the external force type and the magnitude and the frequency of the external force detected by the pressure detector, wherein the vehicle body comprises at least one graphic mark carrier, and each graphic mark carrier is provided with an identity mark pattern of the vehicle; the detector is in one-to-one correspondence with the graphic mark carrier;
the pressure detector is located on a surface of the corresponding graphic mark carrier, and the identity mark pattern is disposed on a pressure sensing surface of the pressure detector; and the sound detector is located within a range of a first distance from the identity mark pattern.

2. The vehicle according to claim 1, wherein the vehicle is a two-wheeled vehicle, the vehicle body comprises a handlebar and a lock; at least one of the handlebar and the lock is used as the graphic mark carrier.

3. The vehicle according to claim 1, wherein the graphic mark carrier is further provided with a protective layer covering the identity mark pattern and transmitting light.

4. The vehicle according to claim 3, wherein the protective layer is a graphene layer.

5. The vehicle according to claim 4, wherein the sound detector and the pressure detector are coupled to the controller by wires, the vehicle body comprises a support frame, the support frame comprises a plurality of support rods which are at least partially hollow, the sound detector and the wires are disposed in the support rods.

6. The vehicle according to claim 1, wherein the vehicle body comprises a lock configured to restrict a rotation of a wheel in a locked state to lock the vehicle body;
the detector comprises a height detecting device disposed on the wheel, the characteristic information at least comprises a height of a reference position on the wheel, the height detecting device is configured to detect the height of the reference position on the wheel during locking of the vehicle body; the controller is further configured to determine whether the vehicle body has an abnormal movement according to change information of the height of the reference position on the wheel during locking of the vehicle body.

7. The vehicle according to claim 6, wherein the lock comprises a lock cylinder, the wheel has a plurality of spokes; in the lock in the locked state, the lock cylinder passes through a space between the spokes;

the controller is configured to calculate a difference between each height detected by the height detecting device and a first height during locking of the vehicle body; the abnormal movement of the vehicle body is determined in a case where the difference is not less than $4*R \sin(\alpha/2)$; wherein R is a radius of the wheel and $\alpha$ is an angle between the spokes of the wheel.

8. The vehicle according to claim 1, wherein the vehicle body comprises a lock configured to restrict rotation of a wheel in a locked state to lock the vehicle body;

the detector comprises a friction detecting device disposed on the wheel, the characteristic information at least comprises a friction distance between the wheel and a ground, the friction detecting device is configured to detect the friction distance between the wheel and the ground during locking of the vehicle body; the controller is further configured to determine whether the vehicle body has an abnormal movement according to the friction distance detected by the friction detecting device.

9. The vehicle according to claim 8, wherein the lock comprises a lock cylinder, the wheel has a plurality of spokes; in the lock in the locked state, the lock cylinder passes through a space between the spokes;

the controller is configured to determine the abnormal movement of the vehicle body in a case where the friction distance is not less than $\pi*R*\alpha/90$; wherein R is a radius of the wheel and $\alpha$ is an angle between the spokes of the wheel.

10. The vehicle according to claim 1, wherein the pickproof device further comprises an alarm coupled to the controller;

the controller is further configured to generate an alarm control signal in response to determining the abnormal state; and the alarm is configured to generate an alarm signal according to the alarm control signal.

11. The vehicle according to claim 10, wherein the alarm is configured to generate at least one of sound, light, and vibration.

12. The vehicle according to claim 10, wherein the pickproof device further comprises a positioning device and a communication device both coupled to the controller, the positioning device is configured to acquire position information of the vehicle;

the controller is configured to, in response to determining the abnormal state, send reminder information by the communication device to a management terminal supervising the vehicle or at least one user terminal located around the vehicle and having a distance from the vehicle that is less than a second distance, and the reminder information at least comprises the position information of the vehicle.

13. The vehicle according to claim 12, wherein the reminder information further comprises information of the abnormal state.

\* \* \* \* \*